United States Patent
Chang et al.

(10) Patent No.: US 10,309,617 B2
(45) Date of Patent: Jun. 4, 2019

(54) PHOSPHOR WHEEL

(71) Applicant: DELTA ELECTRONICS, INC., Taoyuan (TW)

(72) Inventors: Keh-Su Chang, Taoyuan (TW); Yen-I Chou, Taoyuan (TW); Chi Chen, Taoyuan (TW); Chun-Hsien Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 187 days.

(21) Appl. No.: 15/467,300

(22) Filed: Mar. 23, 2017

(65) Prior Publication Data

US 2018/0031207 A1 Feb. 1, 2018

Related U.S. Application Data

(60) Provisional application No. 62/369,296, filed on Aug. 1, 2016.

(30) Foreign Application Priority Data

Nov. 14, 2016 (TW) .............................. 105137148 A

(51) Int. Cl.
*F21V 9/30* (2018.01)
*G03B 21/16* (2006.01)
*G03B 21/20* (2006.01)

(52) U.S. Cl.
CPC ................ *F21V 9/30* (2018.02); *G03B 21/16* (2013.01); *G03B 21/204* (2013.01)

(58) Field of Classification Search
CPC .......... F21V 9/30; G03B 21/16; G03B 21/204
See application file for complete search history.

(56) References Cited

U.S. PATENT DOCUMENTS

| | | | |
|---|---|---|---|
| 9,010,971 B2 | 4/2015 | Wang et al. | |
| 9,470,887 B2 | 10/2016 | Tsai et al. | |
| 2015/0009685 A1* | 1/2015 | Wang | ...................... G03B 21/16 362/323 |
| 2015/0229892 A1* | 8/2015 | Dai | ...................... H04N 9/3158 353/31 |
| 2016/0077325 A1* | 3/2016 | Tsai | ...................... G02B 26/008 353/31 |

(Continued)

FOREIGN PATENT DOCUMENTS

| | | |
|---|---|---|
| TW | I460525 | 11/2014 |
| TW | I530751 | 4/2016 |

*Primary Examiner* — Mary Ellen Bowman
(74) *Attorney, Agent, or Firm* — Kirton McConkie; Evan R. Witt

(57) ABSTRACT

A phosphor wheel includes a substrate, at least a phosphor agent and a plurality of vortex generators. The substrate has a first region and a second region. The second region has a plurality of openings. The phosphor agent is disposed on the first region for converting the wavelength of waveband light. Each vortex generator includes at least a guide vane. Each guide vane is disposed on the second region, and the projection, which is on the second region, of each guide vane is corresponded to one of the openings, such that a vortex is generated during a rotation of the substrate. Therefore, the efficiency of heat exchange is enhanced, the temperature of light spot is reduced, and further the output efficiency of light of the phosphor agent is increased.

20 Claims, 6 Drawing Sheets

(56) References Cited

U.S. PATENT DOCUMENTS

2016/0077326 A1\* 3/2016 Yamagishi ........... G02B 26/008
  353/61
2017/0175989 A1\* 6/2017 Yamagishi ............. G03B 33/08
2017/0269463 A1\* 9/2017 Katsumata ........... G03B 21/204

\* cited by examiner

PHOSPHOR WHEEL

CROSS-REFERENCE TO RELATED APPLICATION

This application claims the benefits of U.S. Provisional Application Ser. No. 62/369,296 filed on Aug. 1, 2016, and Taiwan Application TW 105137148 filed on Nov. 14, 2016, the entirety of which is hereby incorporated by reference.

FIELD OF THE INVENTION

The present invention relates to a phosphor device, and more particularly to a phosphor wheel applied to an illumination system of a projector.

BACKGROUND OF THE INVENTION

In recent years, a variety of projectors have been widely used in various video applications. Phosphor wheels are usually utilized as illumination elements and cooperated with laser sources for exciting and converting one or more color lights.

Generally, a conventional phosphor wheel is loaded on a motor for rotation. Please refer to FIG. 1. FIG. 1 schematically illustrates the structure of a conventional phosphor wheel of prior art. Phosphor powder is coated on an outer rim of the substrate 10 of the conventional phosphor wheel 1 to form a phosphor rim 11. Since the laser source is fixedly projected on the same position, during the rotation the entirety of the phosphor rim 11 can be used by the laser source to excite and convert color lights, and can be used to dissipate heat simultaneously.

The beam of laser source is directly projected on the phosphor rim 11, and the heat source range 12 is indicated as dashed lines in FIG. 1. Since laser has the characteristic of high energy density, the exciting trajectory of a light spotlight spot becomes the position of high-temperature heat source, which causes poor temperature uniformity. The operational temperature of the phosphor powder is relatively high, such that the light output efficiency is decreased, and even the binder binding the phosphor powder in the phosphor rim 11 may be burnt up.

Although heat-dissipating fans or heatsinks are utilized in some product and adhered on the backside of a phosphor wheel, in this manner it will significantly increase the weight and volume of the phosphor wheel. If the volume is not enough, the effectivity of heat-dissipation is limited. Other products in the prior art are formed as having a substrate with continuously concave-convex surface structure. However, the airflow is only generated at one side of the substrate under this circumstance. The air over the front side and the backside cannot be exchanged with each other. The effectiveness of heat-dissipation is poor.

Therefore, there is a need to provide an improved phosphor wheel that enhances the effectiveness of heat-dissipation and the light output efficiency and eliminate the above drawbacks.

SUMMARY OF THE INVENTION

The present invention provides a phosphor wheel. By utilizing the guide vanes of the plurality of vortex generators and the corresponded openings, a vortex may be generated during rotation of the substrate. With this, the efficiency of heat exchange may be enhanced, the temperature of light spot may be reduced, and the output efficiency of light of the phosphor agent may be increased.

In accordance with an aspect of the present invention, there is provided a phosphor wheel applied to convert a wavelength of a waveband light. The phosphor wheel includes a substrate, a phosphor agent and a plurality of vortex generators. The substrate has a first region and a second region. The second region has a plurality of openings. The phosphor agent is disposed on the first region for converting the wavelength of waveband light. Each vortex generator includes at least one guide vane disposed on the second region and projects over at least one of the openings. The vortex generator is configured to generate an airflow through the openings proximal to the guide vanes during a rotation of the phosphor wheel.

In accordance with another aspect of the present invention, there is provided a phosphor wheel applied to convert a wavelength of a waveband light. The phosphor wheel includes a substrate, a phosphor agent and a plurality of vortex generators. The substrate has a first region and a second region. The second region has a plurality of openings. The phosphor agent is disposed on the first region for converting the wavelength of the waveband light. Each vortex generator includes two symmetric guide vanes. The two symmetric guide vanes are disposed on the second region and projects over a corresponding opening, such that a vortex is generated during a rotation of the substrate to effect a heat exchange through the openings.

In accordance with another aspect of the present invention, there is provided a phosphor wheel. The phosphor wheel includes a substrate, a phosphor agent and a plurality of guide vanes. The substrate has an uneven inner ring surface and an even outer ring surface. The phosphor agent is disposed on the even outer ring surface. The guide vanes are disposed on the uneven inner ring surface. A rotation of the substrate generates a vortex of air flowing via the guide vanes.

The present invention will become more readily apparent to those ordinarily skilled in the art after reviewing the description of the embodiments with reference to the accompanying drawings.

DESCRIPTION OF EMBODIMENTS

The following description of embodiments of the invention is presented herein for understanding the invention and is not intended to be exhaustive or limited to the precise form disclosed.

Figure 1:
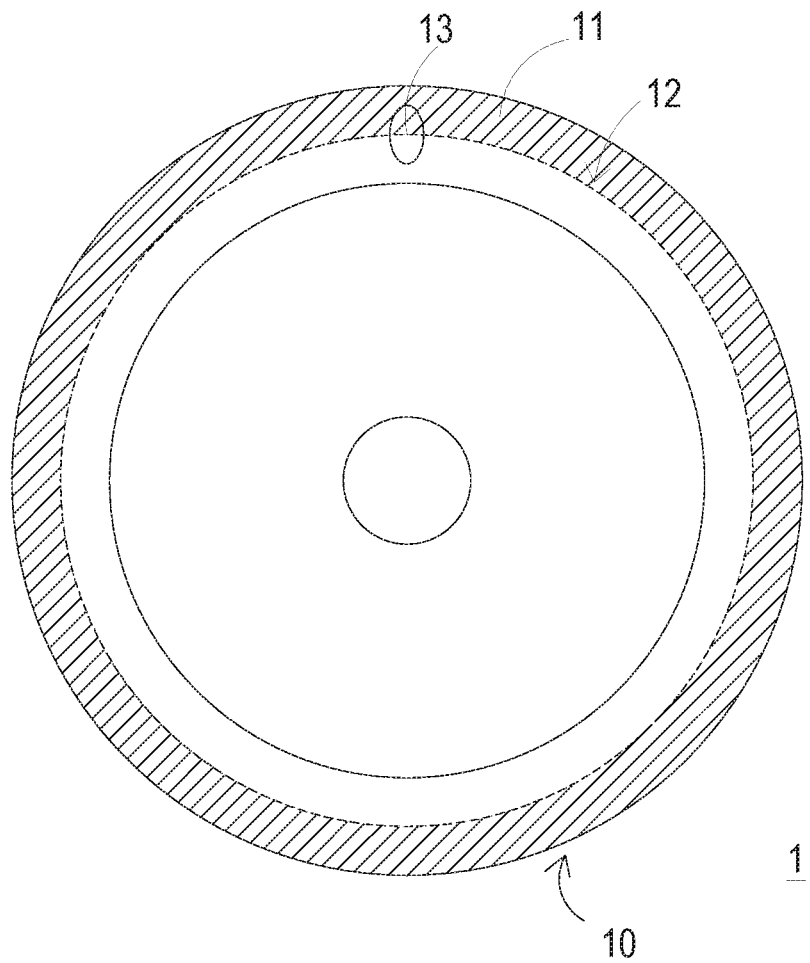
FIG. 1 illustrates a structure of a conventional phosphor wheel of prior art.
Figure 2:
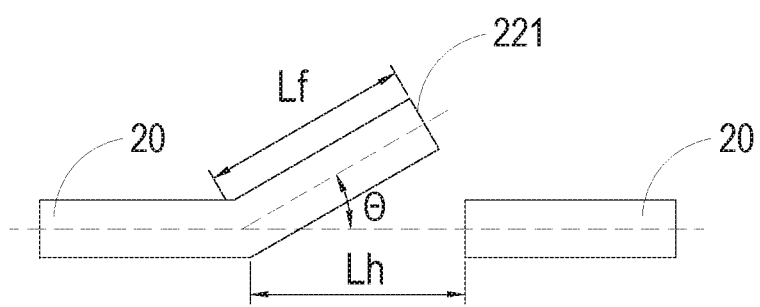
FIG. 2 illustrates an angle between a substrate and a guide vane of a vortex generator of a phosphor wheel, and an aperture length of a corresponding opening, according to an embodiment of the present invention.
Figure 3:
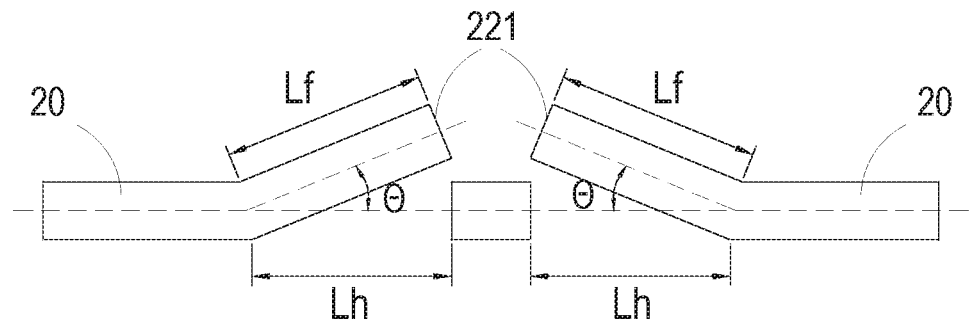
FIG. 3 illustrates the angles between a substrate and a pair of guide vanes of a vortex generator of a phosphor wheel, and the aperture lengths of corresponding openings, according to an embodiment of the present invention.
Figure 4:
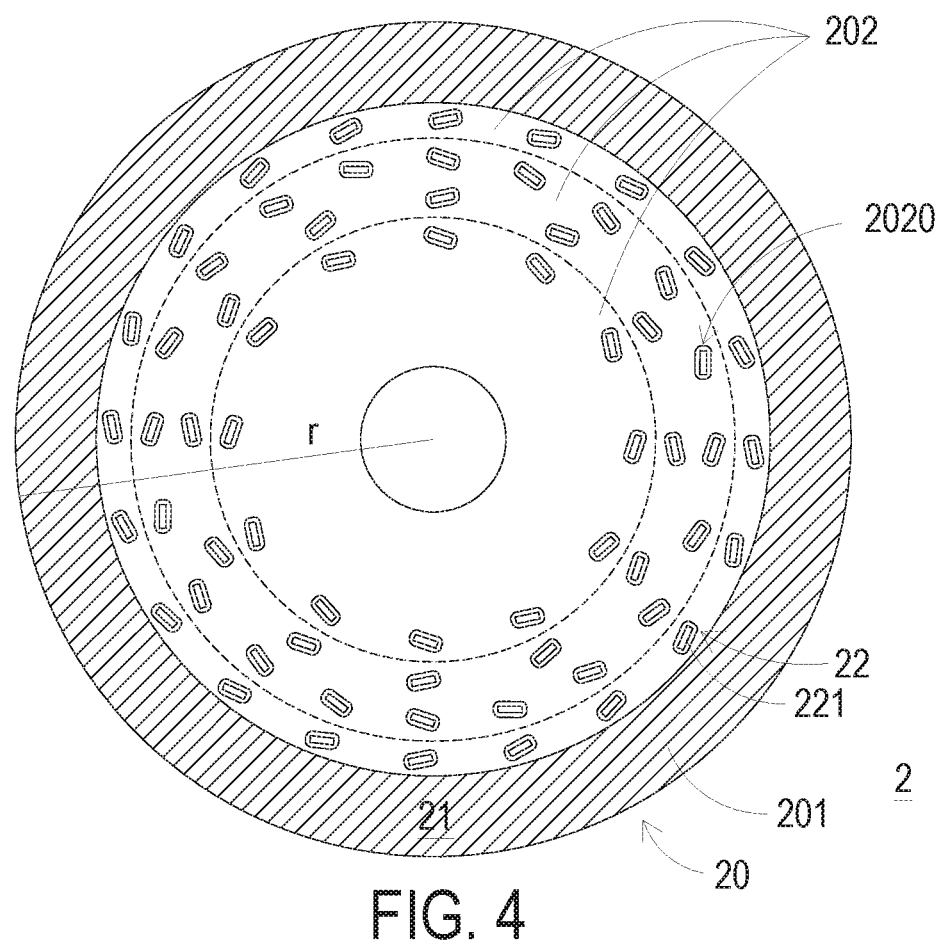
FIG. 4 illustrates a structure of a substrate according to an embodiment of the present invention.

As shown in FIG. 2, FIG. 3 and FIG. 4, a phosphor wheel 2 is provided to convert the wavelength of a waveband light (e.g. convert blue light laser into yellow light). The phosphor wheel 2 includes a substrate 20, at least a phosphor agent 21 and a plurality of vortex generators 22. The substrate 20, which is not limited to a metal substrate or a ceramic substrate, has a first region 201 and a second region 202. The second region 202 has a plurality of openings 2020. The phosphor agent 21 is disposed on the first region 201 for converting the wavelength of waveband light, such that the first region 201 is configured as a wavelength conversion region. The second region 202 is configured as a non-wavelength conversion region. Each vortex generator 22 includes at least a guide vane 221 (as shown in FIG. 2). Each vortex generator 22 may also include two symmetric guide vanes 221 (as shown in FIG. 3). Each guide vane 221 corresponds to and projects over one of the openings 2020. During a rotation of the substrate 20, airflow is affected by the guide vane 221 and the opening 2020, and a vortex is generated. The air over the front side and the back side of the substrate 20 can be exchanged through the openings 2020 and the efficiency of heat exchange between the substrate 20 and the environment is enhanced. Further, the temperature of light spot is reduced and the output efficiency of light emission from the phosphor agent is increased.

The plurality of openings 2020 of the second region 202 of the substrate 20 can be replaced with a plurality of indentations. That is, the guide vane 221 can be formed by partially peeling from the surface of the substrate 2020 and may be bent. In this configuration, there is no opening for air exchange between the front side and back side of the substrate 20, however a similar effect of generating air flow can be achieved for use to reduce temperature.

In some embodiments, the substrate 20 is circular, and the vortex generators 22 are disposed circumferentially and located at radius less than the radius r of the substrate 20. The circular substrate 20 may include a plurality of concentric circle regions radially adjacent to each other within a radius r. The vortex generators 22 may be entirely disposed circumferentially within one concentric circle region, or disposed circumferentially amongst different concentric circles regions. Further, as shown in FIG. 4, guide vanes 221 of vortex generators 22 are at least partially disposed around the periphery of an opening 2020 so as to form an enclosure-like structure. The opening 2020 is at least partially surrounded by the guide vane 221, hence the convection effect of the airflow around the opening 2020 is enhanced.

In some embodiments, each guide vane 221 extends from the substrate 20, and a first angle θ between the guide vane 221 and the plane of substrate 20 is greater than or equal to 10 degrees and less than or equal to 90 degrees. Also, the ratio of the length Lf of the guide vane 221 portion extending from the substrate 20 along the circumference of the concentric circle to the aperture length Lh of the corresponded opening 2020, may be greater than or equal to 0.1 and less than or equal to 10.

In some embodiments, the substrate 20 can be a multi-layer substrate that further includes a first-layer plate and a second-layer plate (not shown). The first-layer plate has a plurality of vortex generators 22 and guide vanes 221. The second-layer plate, which has a plurality of openings 2020, is disposed on the first-layer plate. When the first-layer plate and the second-layer plate are overlapped, each guide vane 221 textends through one of the openings 2020, so that a similar form and function as the above-mentioned embodiments can be achieved.

Referring to FIG. 4, FIG. 5A, FIG. 5B, FIG. 5C and FIG. 5D, according to an embodiment, the guide vanes 221 of the vortex generators 22 may be formed by cutting and bending the substrate 20. By integrally forming the guide vanes 221 from the substrate 20 the manufacturing cost may be lowered. According to other embodiments, the guide vanes 221 are not integral with one layer of the substrate 20 and may be attached on, or extended through from another layer of the substrate 20. To increase the air flow effect or achieve a specific effectiveness of heat-dissipation, the length Lf of the guide vane 221 extending from the substrate 20 along the circumference of the concentric circle can be increased or reduced for meeting the design requirement or the practical demands. For example, the length Lf can be lengthened through stretching, lengthened by connecting an extension portion, or shortened by cutting or by compressing.

Figure 5A:
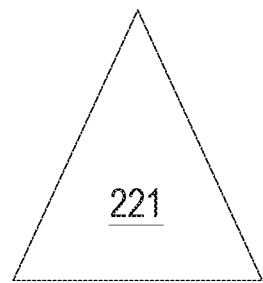
FIG. 5A illustrates a triangular guide vane according to an embodiment of the present invention.
Figure 5B:
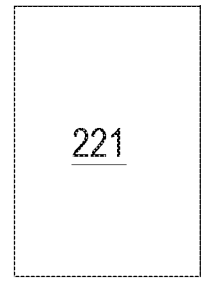
FIG. 5B illustrates a quadrilateral guide vane according to an embodiment of the present invention.
Figure 5C:
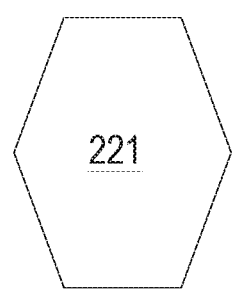
FIG. 5C illustrates a hexagonal guide vane according to an embodiment of the present invention.
Figure 5D:
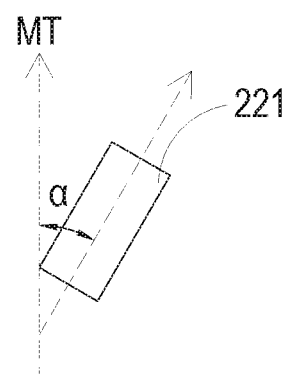
FIG. 5D illustrates an angle between a guide vane and a motion tangent direction of a substrate.

The shape of the guide vane 221 and the shape of a corresponded opening 2020 may be different or similar. In some embodiments, the guide vane 221 has a polygonal shape. For example, the guide vane 221 can be triangular (as shown in FIG. 5A), quadrilateral (as shown in FIG. 5B), or hexagonal (as shown in FIG. 5C). At least one edge of the polygonal guide vane is connected with the substrate 20. Further, as shown in FIG. 5D, the axial direction of the guide vane 221 and a motion tangent direction MT of the substrate 20 have a second angle α, wherein the second angle α is greater than or equal to 0 degree and less than or equal to 90 degrees.

Figure 6:
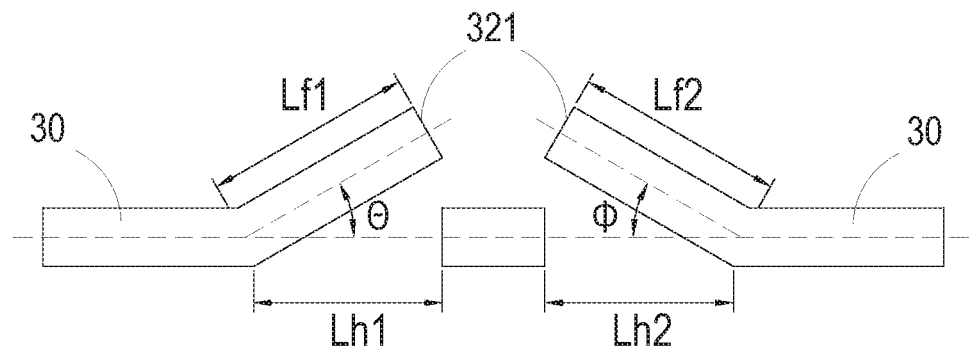
FIG. 6 illustrates the angles between a substrate and a pair of guide vanes of a vortex generator of a phosphor wheel and the aperture lengths of corresponding openings, according to another embodiment of the present invention.
Figure 7:
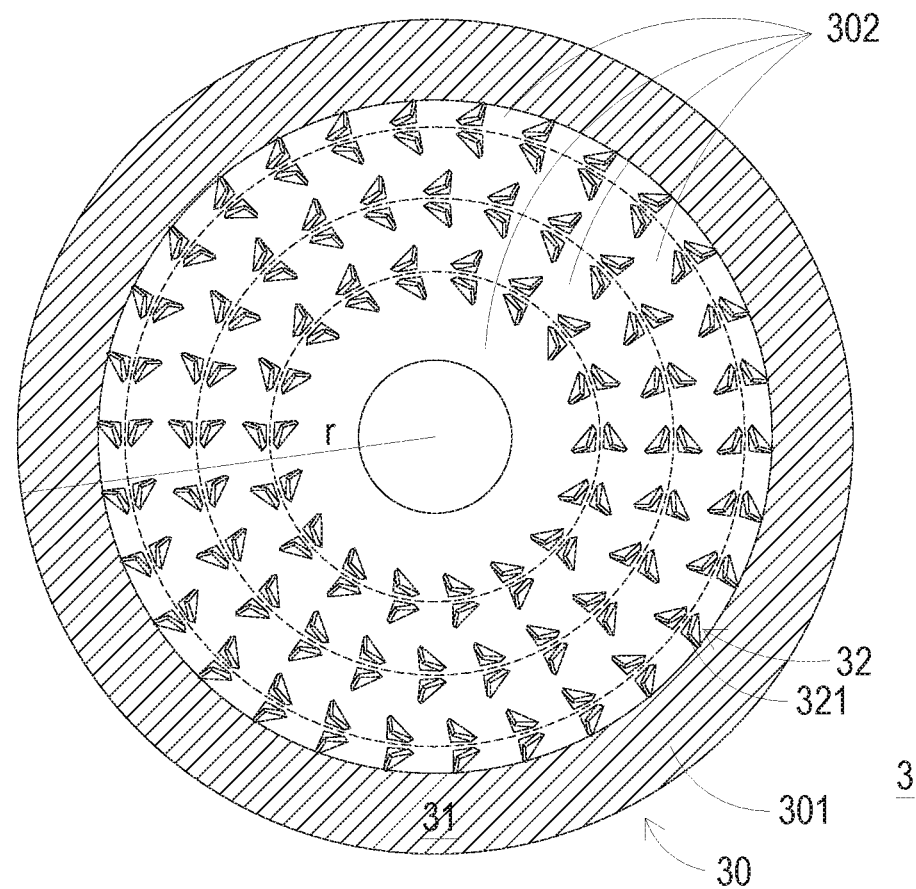
FIG. 7 illustrates a structure of a substrate according to another embodiment of the present invention.

Referring to FIG. 6 and FIG. 7, according to an embodiment, a phosphor wheel 3 includes a substrate 30, at least a phosphor agent 31 and a plurality of vortex generators 32. The substrate 30 has a first region 301 and a second region 302. Similarities between this embodiment and the embodiments described above are not repeated herein. In this embodiment, each vortex generator 32 includes two symmetric or asymmetric guide vanes 321. The two guide vanes 321 are disposed around the circumference of a concentric circle with radius less than the radius r of the substrate 30. The projection of a guide vane 321 on the second region 302 corresponds to an opening of the second region 302, such that a vortex is generated during a rotation of the substrate 30, thereby enhancing the efficiency of heat exchange through the openings.

Figure 8A:
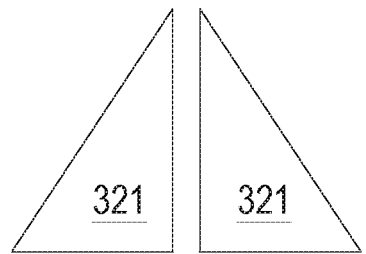
FIG. 8A illustrates a pair of triangular guide vanes according to an embodiment of the present invention.
Figure 8B:
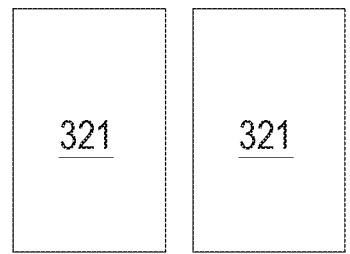
FIG. 8B illustrates a pair of quadrilateral guide vanes according to an embodiment of the present invention.
Figure 8C:
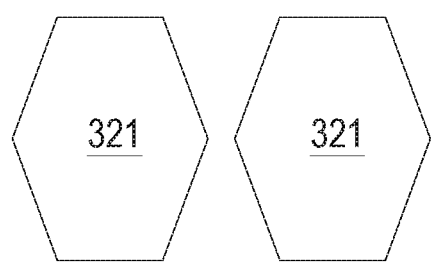
FIG. 8C illustrates a pair of hexagonal guide vanes according to an embodiment of the present invention.
Figure 8D:
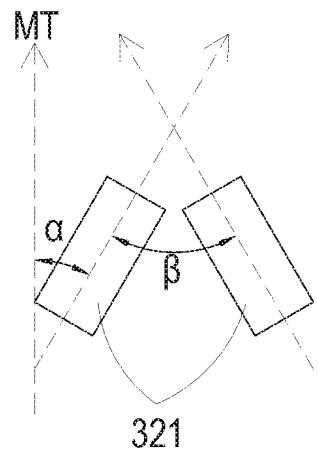
FIG. 8D illustrates the angles between a pair of guide vanes and a motion tangent direction of a substrate.

With further reference to FIG. 8A, FIG. 8B, FIG. 8C and FIG. 8D, each guide vane 321 of the vortex generators 32 of the phosphor wheel includes polygonal shaped guide vanes. For example, the guide vane 321 can be a pair of triangular guide vane (as shown in FIG. 8A), a pair of quadrilateral guide vane (as shown in FIG. 8B), or a pair of hexagonal guide vane (as shown in FIG. 8C). At least one edge of each polygonal guide vane is connected with the substrate 30. In this configuration, the guide vanes 321 and a motion tangent direction MT of the substrate 30 have a second angle α, and the two guide vanes 321 further have a third angle β. The second angle α is greater than or equal to 0 degree and less than or equal to 90 degrees, and the third angle β is greater than or equal to 0 degree and less than or equal to 180 degrees.

For example, when the third angle β is less than 180 degrees (i.e. the two guide vanes are not parallel with each other on a straight line), the two guide vanes form a configuration having a wider opening at one end and a narrower opening at the other end. In this configuration, during rotation of the substrate 30, airflow can enter from the narrower opening and exit the other side out the wider opening. That is, with the airflow entering from the side with a smaller channel and exiting from the other side with a larger channel, flow resistance can be reduced, and the vortex air flow effect and the efficiency of heat-dissipation can be enhanced.

Shown in FIG. 6, the two guide vanes 321 are symmetric and disposed opposite to each other relative to the circumference of the concentric circle. In this configuration, the length Lf1 and the length Lf2 of the two guide vanes 321 extend from the substrate 30 in opposition direction but both along the circumference of the concentric circle and are identical. The first angle θ between one of the guide vanes 321 and a plane of the substrate 30, and a fourth angle φ between the other guide vane 321 and the plane of the substrate 30, are also identical.

Alternatively, the two guide vanes 321 can be configured as two different or partially different guide vanes. For example, the lengths of the two guide vanes 321 or their angles to the plane of the substrate 30 may be different. For example, in an embodiment, the length Lf1 and the length Lf2 are different, and the first angle θ and the fourth angle φ are the same. In another embodiment, the length Lf1 and the length Lf2 are the same, and the first angle θ and the fourth angle φ are different. In another embodiment, the length Lf1 and the length Lf2 are different, and the first angle θ and the fourth angle φ are different.

Further, the location and configuration of the two guide vanes 321 and the aperture lengths Lh1 and Lh2 of the respectively corresponding openings can be varied to meet practical demands, and further optimized using heat flow simulations.

Table I below shows the operational temperatures of a conventional phosphor wheel and a phosphor wheel of the present invention under different laser powers. Table II shows the percentages of normalized efficiency of heat-dissipation of a conventional phosphor wheel and a phosphor wheel of the present invention under different laser powers. It should be noted that in the data shown in Table I and Table II, each of the vortex generator of the phosphor wheel includes one guide vane, and the guide vane is a quadrilateral guide vane.

TABLE I

| Laser power (Watt)/ Operational temperature (° C.) | Conventional phosphor wheel (° C.) | Phosphor wheel of the present invention (° C.) |
|---|---|---|
| 25 | 72.1 | 58.9 |
| 76 | 82.5 | 77.6 |
| 102 | 89.7 | 83.8 |
| 152 | 111.4 | 113.3 |
| 170 | 121.3 | 136.1 |
| 209 | 164.2 | 152.4 |

TABLE II

| Laser power (Watt)/ Efficiency of heat-dissipation (%) | Conventional phosphor wheel (%) | Phosphor wheel of the present invention (%) |
|---|---|---|
| 25 | 100.0 | 111.4 |
| 76 | 100.0 | 112.9 |
| 102 | 100.0 | 111.4 |
| 152 | 100.0 | 110.5 |
| 170 | 100.0 | 109.7 |
| 209 | 100.0 | 111.8 |

It can be seen from Table I and Table II that the efficiency of heat-dissipation of the phosphor wheel of the present invention can be effectively enhanced, and the operational temperature of the phosphor wheel during wavelength conversion can be reduced without adding component volume and weight.

Referring back to FIG. 6 and FIG. 7, in some embodiments, the phosphor wheel 3 may be considered as including a substrate 30, at least a phosphor agent 31 and a plurality of guide vanes 321. The substrate 30 includes an uneven surface of the inner ring and an outer ring even surface. The phosphor agent 31 is disposed on the outer ring even surface and the guide vanes 321 are disposed on the inner ring uneven surface, such that a vortex is generated during a rotation of the substrate 30. In an embodiment, the guide vanes 321 are formed by cutting and bending of the inner ring uneven surface of the substrate 30. An opening is formed at each place cut corresponding to each guide vane 321 on the substrate 30, and each opening aperture penetrates through the substrate 30. The ratio of the length of each guide vane 321 to the aperture length of the corresponding opening is greater than or equal to 0.1, and less than or equal to 10. Each guide vane 321 and the substrate 30 have an angle greater than or equal to 10 degrees and less than or equal to 90 degrees.

While the invention has been described in terms of what is presently considered to be the more practical embodiments, it is to be understood that the invention need not be limited to the disclosed embodiment. The present disclosure is intended to cover various modifications and similar arrangements included within the spirit and scope of the appended claims which are to be accorded with the broadest interpretation so as to encompass all such modifications and similar structures.

What is claimed is:

1. A phosphor wheel applied to convert a wavelength of a waveband light, the phosphor wheel including:
   a substrate having a first region and a second region, wherein the second region has a plurality of openings;
   a phosphor agent disposed on the first region for converting the wavelength of the waveband light; and
   a plurality of vortex generators, wherein each vortex generator includes at least one guide vane disposed on the second region and projects over at least one of the openings, and wherein the vortex generator is configured to generate an airflow through the openings proximal to the guide vanes during a rotation of the phosphor wheel.

2. The phosphor wheel according to claim 1, wherein the substrate is circular and includes concentric regions and wherein the vortex generators are disposed circumferentially on the concentric regions.

3. The phosphor wheel according to claim 2, wherein each guide vane extends from the substrate, and a first angle formed between the guide vane and a planar face of the substrate is greater than or equal to 10 degrees and less than or equal to 90 degrees.

4. The phosphor wheel according to claim 3, wherein the guide vane includes a length extending from the substrate and the opening includes an aperture length, and wherein a ratio of the guide vane length to the corresponding aperture length is greater than or equal to 0.1 and less than or equal to 10.

5. The phosphor wheel according to claim 4, wherein each vortex generator includes two guide vanes symmetric with each other relative to the circumference of the concentric region.

6. The phosphor wheel according to claim 5, further including a second angle formed between one of the two guide vanes and a motion tangent direction of the substrate, and a third angle formed the two guide vanes, wherein the second angle is greater than or equal to 0 degree and less than or equal to 90 degrees, and wherein the third angle is greater than or equal to 0 degree and less than or equal to 180 degrees.

7. The phosphor wheel according to claim 6, wherein the two guide vanes and the third angle are configured to include a narrow opening end and a wide opening end, and wherein during the rotation of the phosphor wheel, the generated airflow includes an airstream entering the narrow opening end and an airstream exiting the wider opening end.

8. The phosphor wheel according to claim 2, wherein each vortex generator includes two guide vanes each extending at an angle from the substrate and each having a length along the circumferential direction of the concentric region, and wherein said lengths of the two vanes are the same, and wherein said angles of the two vanes are different.

9. The phosphor wheel according to claim 2, wherein each vortex generator includes two guide vanes each extending at an angle from the substrate and each having a length along the circumferential direction of the concentric region, wherein said lengths of the two vanes are different, and wherein said angles of the two vanes are the same.

10. The phosphor wheel according to claim 2, wherein each vortex generator includes two guide vanes each extending at an angle from the substrate and each having a length along the circumferential direction of the concentric region, and wherein said lengths of the two vanes are the different, and wherein said angles of the two vanes are different.

11. The phosphor wheel according to claim 1, wherein the first region is a wavelength conversion region, and the second region is a non-wavelength conversion region.

12. The phosphor wheel according to claim 1, wherein the guide vanes are formed by a bending of the substrate.

13. The phosphor wheel according to claim 1, wherein each guide vane includes a polygonal shape, and at least one edge of the polygonal shaped guide vane is connected with the substrate.

14. The phosphor wheel according to claim 1, wherein the projection of the guide vane over a corresponding opening and a shape of the corresponded opening are different.

15. A phosphor wheel applied to convert a wavelength of a waveband light, the phosphor wheel including:
a substrate having a first region and a second region, wherein the second region has a plurality of openings;
a phosphor agent disposed on the first region for converting the wavelength of the waveband light; and
a plurality of vortex generators, each vortex generator includes two symmetric guide vanes, wherein the two symmetric guide vanes are disposed on the second region and projects over a corresponding opening, such that a vortex is generated during a rotation of the substrate to effect a heat exchange through the opening.

16. A phosphor wheel, including:
a substrate having an uneven inner ring surface and an even outer ring surface, wherein the substrate is circular and includes concentric regions;
a phosphor agent disposed on the even outer ring surface; and
a plurality of guide vanes disposed on the uneven inner ring surface, wherein a rotation of the substrate generates a vortex of air flowing via the guide vanes, and every two neighboring guide vanes are symmetric with each other relative to a circumference of the corresponding concentric region.

17. The phosphor wheel according to claim 16, wherein the guide vanes are formed by cutting and bending the uneven inner ring surface of the substrate.

18. The phosphor wheel according to claim 17, wherein an opening is formed at each place cut corresponding to each guide vane, and each opening penetrates through the substrate.

19. The phosphor wheel according to claim 18, wherein a ratio of a length of each guide vane to an aperture length of the guide vane's corresponding opening is greater than or equal to 0.1 and less than or equal to 10.

20. The phosphor wheel according to claim 17, wherein each guide vane includes a protrusion extending from the substrate at an angle greater than or equal to 10 degrees and less than or equal to 90 degrees.

* * * * *